United States Patent
Hsu

(10) Patent No.: US 11,160,019 B2
(45) Date of Patent: Oct. 26, 2021

(54) ELECTRONIC DEVICES AND METHODS FOR DETERMINING ENERGY EFFICIENCY

(71) Applicant: MEDIATEK INC., Hsinchu (TW)

(72) Inventor: Chia-Chun Hsu, Hsinchu (TW)

(73) Assignee: MEDIATEK INC., Hsinchu (TW)

( * ) Notice: Subject to any disclaimer, the term of this patent is extended or adjusted under 35 U.S.C. 154(b) by 0 days.

(21) Appl. No.: 16/738,573

(22) Filed: Jan. 9, 2020

(65) Prior Publication Data

US 2020/0229085 A1 Jul. 16, 2020

Related U.S. Application Data

(60) Provisional application No. 62/791,103, filed on Jan. 11, 2019.

(51) Int. Cl.
*H04W 52/02* (2009.01)
*H04W 24/10* (2009.01)

(52) U.S. Cl.
CPC ....... *H04W 52/0209* (2013.01); *H04W 24/10* (2013.01)

(58) Field of Classification Search
CPC ... H04W 52/0209; H04W 24/10; H04B 17/30
See application file for complete search history.

(56) References Cited

U.S. PATENT DOCUMENTS

| | | | | |
|---|---|---|---|---|
| 7,515,926 B2* | 4/2009 | Bu | ...... | H04W 12/125 455/522 |
| 2012/0083211 A1* | 4/2012 | Jeon | ...... | H04W 52/246 455/41.2 |
| 2015/0156714 A1* | 6/2015 | Xia | ...... | H04W 24/08 455/405 |
| 2018/0049182 A1* | 2/2018 | Luo | ...... | H04W 72/048 |

FOREIGN PATENT DOCUMENTS

| | | |
|---|---|---|
| CN | 104159279 A | 11/2014 |
| CN | 105515592 B | 9/2018 |
| CN | 108513342 A | 9/2018 |
| CN | 108901028 A | 11/2018 |

(Continued)

OTHER PUBLICATIONS

International Search Report and Written Opinion dated Apr. 14, 2020 in PCT/CN2020/071427, citing documents AO and AQ therein, 9 pages.

Combined Taiwanese Office Action and Search Report dated Oct. 14, 2020 in Taiwanese Patent Application No. 109100909 (with English translation of Category of Cited Documents), citing documents AP and AQ therein, 7 pages.

(Continued)

*Primary Examiner* — Nguyen T Vo

(74) *Attorney, Agent, or Firm* — Oblon, McClelland, Maier & Neustadt, L.L.P.

(57) ABSTRACT

Aspects of the disclosure provide an electronic device and methods for determining energy efficiency of the electronic device that receives wireless communication service from a network. The electronic device includes processing circuitry. The processing circuitry is configured to determine an amount of data transmitted between the electronic device and the network over a duration. The processing circuitry is configured to determine energy consumption of the electronic device over the duration based on a power consumption model. Further, the processing circuitry is configured to calculate an energy efficiency indicator based on the amount of data transmitted and the energy consumption. In an example, the processing circuitry is configured to report the energy efficiency indicator to the network.

20 Claims, 6 Drawing Sheets

(56) References Cited

FOREIGN PATENT DOCUMENTS

TW            201204135 A1     1/2012
TW            201507530 A      2/2015

OTHER PUBLICATIONS

Combined Taiwanese Office Action and Search Report dated Dec. 23, 2020 in Taiwanese Patent Application No. 109100909 (with English translation of Category of Cited Documents), citing document AO through AQ therein, 6 pages.

* cited by examiner

| Power State | Operation/configuration | Relative Power |
|---|---|---|
| 1 | 1 | 1.1 |
| 2 | 2 | 19.5 |
| 3 | 3 | 45.5 |
| 4 | 4 | 105 |
| 5 | 5 | 310 |

| Power State | Operation/Configuration | Relative Power |
|---|---|---|
| 1 | 1 | 1 |
| 2 | 2 | 20 |
| 3 | 3 | 45 |
| 4 | 4 | 100 |
| 5 | 5 | 300 |

ELECTRONIC DEVICES AND METHODS FOR DETERMINING ENERGY EFFICIENCY

INCORPORATION BY REFERENCE

This present application claims the benefit of priority to U.S. Provisional Application No. 62/791,103 filed on Jan. 11, 2019, which is incorporated by reference herein in its entirety.

TECHNICAL FIELD

The present application relates generally to wireless communication technology including power management for an electronic device.

BACKGROUND

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

High frequency bands (e.g., above 6 GHz) is used in 5th Generation (5G) wireless communication systems to increase a data rate. Power consumption of an electronic device can increase significantly when the data rate increases and can, for example, lead to overheating of the electronic device. Mechanisms to reduce the power consumption of the electronic device can be employed to save energy.

SUMMARY

Aspects of the disclosure provide an electronic device that includes processing circuitry. The processing circuitry is configured to determine an amount of data transmitted between the electronic device and a network over a duration where the electronic device receives wireless communication service from the network. The processing circuitry is configured to determine an energy consumption of the electronic device over the duration based on a power consumption model and calculate an energy efficiency indicator based on the amount of data transmitted and the energy consumption.

In an example, the processing circuitry is configured to periodically report the energy efficiency indicator to the network. In an example, the processing circuitry is further configured to report the energy efficiency indicator to the network based on a triggering event.

In an embodiment, the duration corresponds to one or more radio resource control connections or a pre-defined duration.

In an embodiment, the power consumption model includes power states that indicate different levels of power consumptions. The duration includes multiple time slots. For each of the multiple time slots, the processing circuitry is configured to determine a slot-specific power state based on operations of the electronic device within the time slot where the slot-specific power state is one of the power states in the power consumption model. The processing circuitry is configured to calculate the energy consumption over the duration based on respective slot-specific power states for the multiple time slots. In an example, the power states in the power consumption model are specific to the electronic device and are different from power states in a network power consumption model used.

In an embodiment, the amount of data transmitted includes user data and excludes control data over the duration.

Aspects of the disclosure provide a method for determining energy efficiency of an electronic device. The method includes determining an amount of data transmitted between the electronic device and a network over a duration where the electronic device receives wireless communication service from the network. The method includes determining an energy consumption of the electronic device over the duration based on a power consumption model and calculating an energy efficiency indicator based on the amount of data transmitted and the energy consumption.

In an example, the method includes periodically reporting the energy efficiency indicator to the network. In an example, the method includes reporting the energy efficiency indicator to the network based on a triggering event.

In an example, the energy efficiency indicator is a key performance indicator of the network. In an example, calculating the energy efficiency indicator includes calculating the energy efficiency indicator as a ratio of the amount of data transmitted over the energy consumption.

Aspects of the disclosure provide a method for determining energy efficiency of an electronic device. In an embodiment, the method is implemented by processing circuitry of a network where the electronic device receives wireless communication service from the network. The method includes determining an amount of data transmitted between the electronic device and the network over a duration. The method includes determining an energy consumption of the electronic device over the duration based on a power consumption model and calculating an energy efficiency indictor based on the amount of data transmitted and the energy consumption.

In an embodiment, the power consumption model includes power states that indicate different levels of power consumptions. The duration includes multiple time slots. For each of the multiple time slots, determining the energy consumption includes determining a slot-specific power state based on configurations of the electronic device within the time slot. The slot-specific power state is one of the power states in the power consumption model. Determining the energy consumption further includes calculating the energy consumption over the duration based on respective slot-specific power states for the multiple time slots. In an example, the power consumption model is a network power consumption model.

In an embodiment, the amount of data transmitted includes user data and excludes control data over the duration.

In an embodiment, the network includes a first base station and a second base station. The electronic device is configured for dual connectivity (DC) with the first base station and the second base station in one of the multiple time slots. The method further includes receiving a signal from at least one of: the first base station and the second base station. The signal can indicate at least one of: first user data between the first base station and the electronic device, second user data between the second base station and the electronic device, and a DC configuration of the electronic device in the one of the multiple time slots. The method includes determining the configurations of the electronic device within the one of the multiple time slots based on the signal. Determining the amount of data includes determining the amount of data based on the signal.

BRIEF DESCRIPTION OF THE DRAWINGS

Various embodiments of this disclosure that are proposed as examples will be described in detail with reference to the following figures, wherein like numerals reference like elements, and wherein:

FIG. 3B shows an exemplary dedicated power consumption model for an electronic device according to an embodiment of the disclosure;

FIG. 3C shows an exemplary standardized power consumption model according to an embodiment of the disclosure;

DETAILED DESCRIPTION OF EMBODIMENTS

Figure 1:
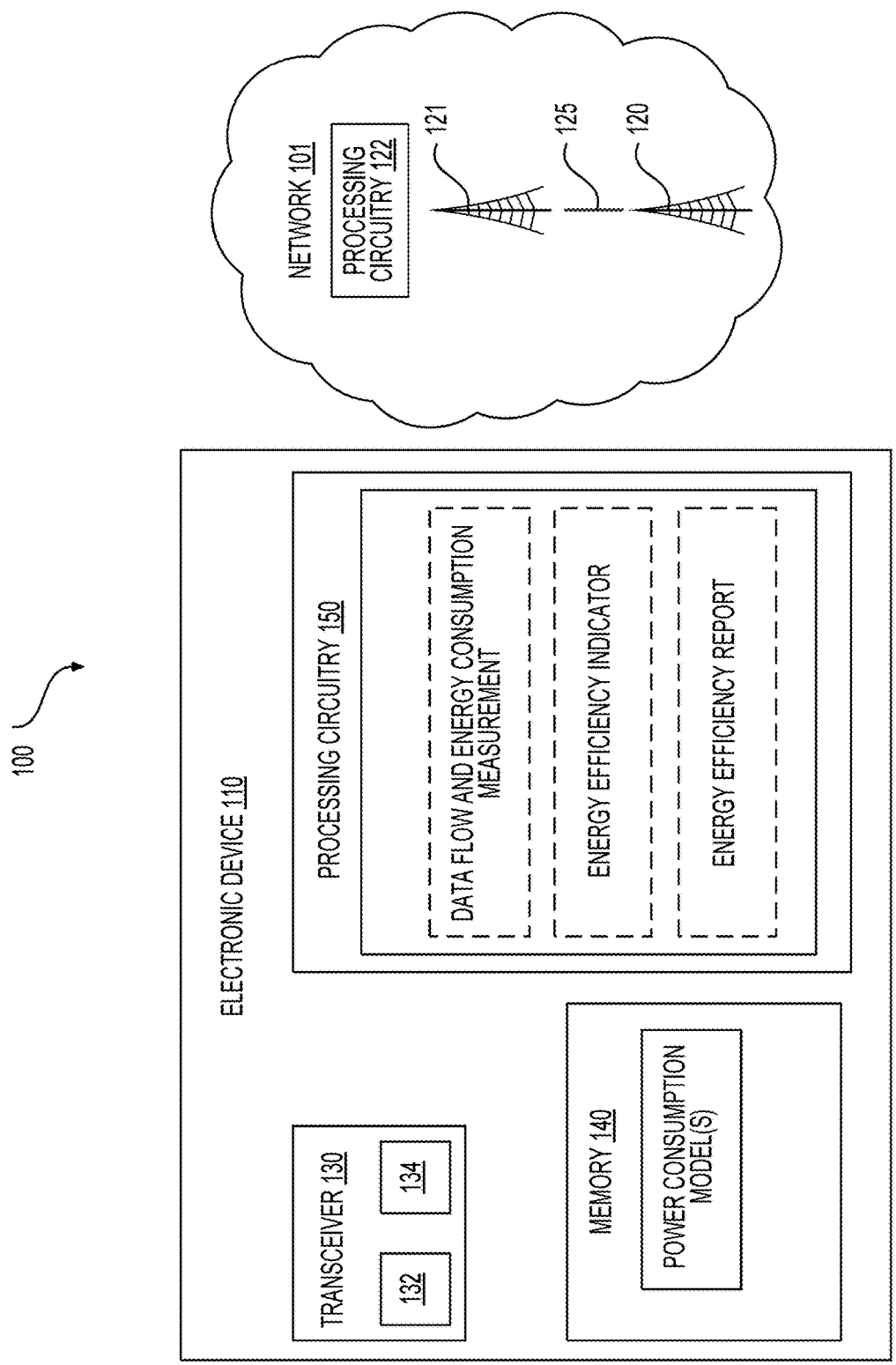
FIG. 1 shows a block diagram of an exemplary communication system 100 according to an embodiment of the disclosure.

FIG. 1 shows a block diagram of an exemplary communication system 100 according to an embodiment of the disclosure. The communication system 100 includes a network 101 and an electronic device 110 that receives wireless communication service from the network 101. According to aspects of the disclosure, an energy efficiency (EE) indicator (e.g., an EE key performance indicator (KPI), an EE figure of merit (FOM)), for example, of the network 101 can be used to indicate energy efficiency the electronic device 110. The EE indicator can be determined based on an amount of data flow between the electronic device 110 and the network 101 over a duration and energy consumed (also referred to as energy consumption) by the electronic device 110 over the same duration. The energy consumption can be determined based on a power consumption model (e.g., a dedicated power consumption model, a standard power consumption model). In an example, the duration corresponds to a duration of a radio resource control (RRC) connection, the amount of data flow represents a user data (or user traffic) during the RRC connection and the energy consumption represents the energy consumed by the electronic device 110 within the RRC connection. The EE indicator can be determined by the electronic device 110 and then reported to the network 101. Alternatively, the EE indicator can be determined by the network 101. The network 101 can subsequently adjust configuration parameters for the electronic device 110, for example, in discontinuous reception (DRX), carrier aggregation (CA), a bandwidth part (BWP), to reduce energy consumption of the electronic device 110.

Referring back to FIG. 1, the network 101 can include base station(s), such as base stations 120-121. The base station 120 can be configured to form one or more first cells that serve the electronic device 110. The one or more first cells can include a primary cell (PCell) having a primary component carrier (PCC) and secondary cell(s) (SCell(s)) having respective secondary component carrier(s) (SCCs). Accordingly, the PCC and one or more of the SCCs can be aggregated and transmitted in parallel to/from the electronic device 110 in CA, and thus increasing a bandwidth and a data rate.

The base station 121 can be configured to form one or more second cells that serve the electronic device 110. The electronic device 110 can be connected to the base stations 120-121, for example, via dual connectivity (DC). In an example, the electronic device 110 is connected to the base station 120 prior to being connected to the base station 121. Thus a master cell group (MCG) including the one or more first cells is formed between the electronic device 110 and the base station 120, and a secondary cell group (SCG) including the one or more second cells is formed between the electronic device 110 and the base station 121. One of the one or more second cells can be a primary secondary cell (PSCell) and remaining one(s) of the one or more second cells can be SCell(s). The base stations 120-121 can be connected via a suitable link 125 (e.g., the link 125 is wired or wireless) to communicate information regarding data flow to/from the base station 120 and data flow to/from the base station 121. Alternatively, the base stations 120-121 can communicate indirectly, for example, via another base station, a core node, or the like.

In an example, the network 101 includes a fifth generation (5G) radio access network (RAN) (or Next Generation (NG) RAN) and a 5G core network (5GC) that uses 5G mobile network technology. The base stations 120-121 are next generation Node Bs (gNBs) specified in 5G new radio (NR) air interface standards developed by 3rd Generation Partnership Project (3GPP).

The network 101 can include the base station(s) and core nodes that are interconnected using any suitable network technology, such as wired, wireless, a cellular communication technology, a local area network (LAN), a wireless LAN (WLAN), a fiber optical network, a wide area network (WAN), a peer-to-peer network, the Internet, and the like. In some embodiments, the network 101 provides wireless communication service to electronic devices, such as the electronic device 110, using any suitable wireless communication technology, such as second generation (2G), third generation (3G), and fourth generation (4G) mobile network technologies, 5G mobile network technology, global system for mobile communication (GSM), long-term evolution (LTE), NR technology, and the like. In some examples, the network 101 employs wireless communication technologies developed by 3GPP. In an example, the base stations (e.g., the base stations 120-121) in the network 101 form one or more access networks and the core nodes form one or more core networks. An access network can be a RAN, such as an Evolved Universal Terrestrial Radio Access (E-UTRA), a 5G RAN or NG RAN. A core network can be an evolved packet core (EPC), a 5GC, and the like.

In various examples, the base stations can include a Node B, an evolved Node B (eNB), a gNB, and the like. In an example, the base stations 120-121 are gNBs specified in 5G NR air interface standards developed by 3GPP. In an example, the base station 120 is a gNB and the base station 121 is an eNB. The base stations 120-121 include hardware components and software components configured to enable wireless communications between the base stations 120-121 and the electronic device 110. Further, the core nodes include hardware components and software components to form a backbone to manage and control the services provided by the network 101.

In some embodiments, high frequencies, also referred to as millimeter Wave (mmWave) frequencies are used as carrier frequencies in the communication system 100 to increase a network capacity. In an example, the high frequencies are higher than 6 giga-Hertz (GHz), such as between 24-84 GHz. In an example, carrier frequencies less than 6 GHz are referred to as low frequencies, such as between 600 MHz to less than 6 GHz. For example, a frequency range 1 (FR1) includes frequencies below 6 GHz and a frequency range 2 (FR2) includes frequencies in the range 24.25-52.6 GHz.

In an embodiment, the electronic device 110 can be any suitable electronic device configured to receive from and transmit to a plurality of cells, such as the one or more first cells via CA. In an example, the electronic device 110 is a terminal device (e.g., user equipment) for wireless communication, such as a cell phone, a smart phone, a tablet computer, a laptop, a smart device, a wearable device, and the like In some embodiments, the electronic device 110 can be connected to the base stations 120-121 via DC, such as in E-UTRA and NR DC. In an example, the base stations 120-121 are gNBs and the electronic device 110 is connected to the base stations 120-121 using NR radio access. In an example, the base station 120 is a gNB and the base station 121 is an eNB. The electronic device 110 is connected to the base station 120 using NR radio access, and to the base station 121 using E-UTRA.

Referring to FIG. 1, the electronic device 110 can include a transceiver 130, processing circuitry 150, and memory 140 that are coupled together, for example, using a bus architecture (not shown). The transceiver 130 is configured to receive and transmit wireless signals. In an example, the transceiver 130 includes a first transceiver 132 that transmits and receives low frequency signals (e.g., within the FR1), and a second transceiver 134 that transmits and receives high frequency signals (e.g., within the FR2). The transceiver 130 can be configured to receive signals from one or more base stations (e.g., the base stations 120-121).

The energy efficiency can be proportional or nearly proportional to power efficiency, and thus the energy efficiency and the power efficiency are used interchangeably in the disclosure.

Configurations for an electronic device by a network, for example, when the electronic device is connected to the network in the connected mode, can have a large effect on energy efficiency of the electronic device as described below.

In an example, a DRX includes periodic repetitions of a sleep mode (or 'OFF') and a wake up mode (or 'ON') where the wake up mode can consume more power than the sleep mode. Various DRX parameter settings can affect the power performance. For example, a DRX inactivity timer can determine how long the electronic device remains 'ON' after a reception of a Physical downlink Control Channel (PDCCH). Thus, when the DRX inactivity timer is set to last a long time, the electronic device may remain 'ON' for a long time even an amount of data transmitted to/received from the electronic device is small.

In an example, a RRC release timer can be used to control a transition of an electronic device between a connected mode and an idle mode. When the RRC release timer is on, a network can wait for a duration set by the RRC release timer, for example, to confirm that data communication between the electronic device and the network is completed, then the network can release the electronic device. When the RRC release timer is set for a long time, the electronic device can enter into a connected mode, for example, to receive a small amount of data, and then wait for a long time (e.g., a few seconds) before being released from the network.

In an example, when CA is configured, an activation and deactivation of SCell(s) or SCCs can be used to save energy. In an example, when a large amount of data is to be delivered to an electronic device, a SCC can be activated. Subsequently, the SCC can be deactivated when there is no more data to be delivered. In an example, the SCC is deactivated based on a SCell deactivation timer that indicates an amount of time that the electronic device has not received data on the SCC. If the SCell deactivation timer is disabled or is set to last a long time, the electronic device can consume a large amount of energy without transmitting/receiving user data.

As described above, an electronic device can consume a large amount of energy in idle monitoring, for example, in monitoring PDCCH without transmitting/receiving user data when a timer, such as a DRX inactivity timer, a RRC release timer, a SCell deactivation timer, is set to last a long time. Thus, suitable configurations (e.g., in DRX, RRC connection, CA) for the electronic device by the network can reduce power consumption (e.g., baseline power consumption) of the electronic device. In an example, the baseline power consumption or a baseline power corresponds to a minimal data rate, for example, the data rate is 0 or an amount of user data is minimal or 0.

Certain mechanisms to configure BWPs, search space pattern, or the like, can also be used to enable fast and flexible configuration adaptations to reduce power consumption of the electronic device. A BWP refers to a continuous set of physical resource blocks. An electronic device can be configured with a plurality of BWPs and one of the plurality of BWPs can be active at a given time. When suitable BWPs are dynamically configured for the electronic device (e.g., a first BWP having a narrow bandwidth is used when a data rate is small and a second BWP having a wide bandwidth is used when the data rate is high), the electronic device can be energy efficient.

Figure 2A:
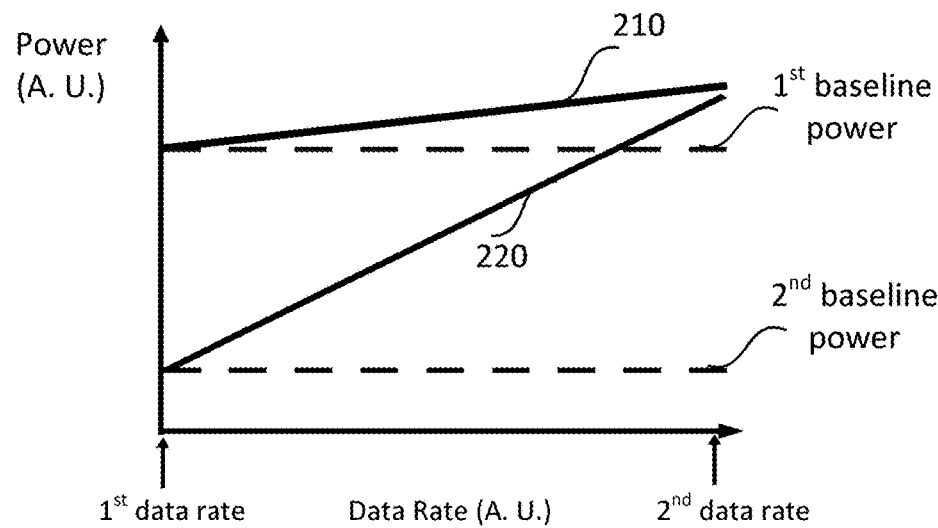
FIG. 2A shows examples of power consumptions according to embodiments of the disclosure.

In an embodiment, in a connected state (or a connected mode), configurations of the electronic device is controlled by the network, and thus suitable configurations for DRX, CA, BWP, and/or the like are important for managing power efficiency of the electronic device. When the configurations for DRX, CA, BWP, cross-slot scheduling, and/or the like are suitably adjusted by the network, the electronic device can be energy efficient. Otherwise, the electronic device can be energy inefficient. When the electronic device experiences overheating or close to being overheated, capabilities (e.g., bandwidth or data rate) of the electronic device may be lowered. For example, CA and/or DC may be disabled to reduce power consumption which leads to a reduction of the data rate. In an example, frequent track area update (TAU) may be implemented In general, power consumption of an electronic device can increase with a data rate. FIG. 2A shows examples of power consumptions according to embodiments of the disclosure. A first power 210 (in arbitrary units (A. U.)) of a first electronic device increases when a data rate (in A. U.) increases indicating that the first electronic device 110 consumes more power when the data rate increases. Similarly, a second power 220 (in A. U.) of a second electronic device increases with the data rate.

Figure 2B:
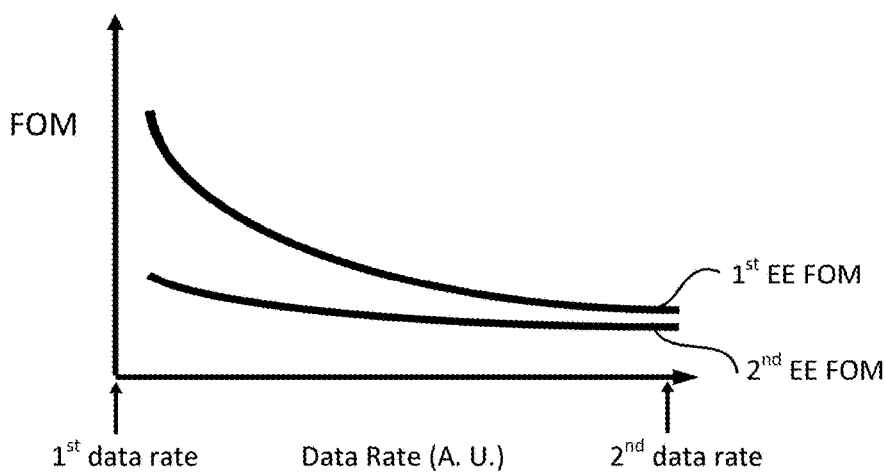
FIG. 2B shows examples of energy efficiency (EE) figure of merits according to embodiments of the disclosure.

An EE FOM can be a ratio of a power used by an electronic device over a corresponding data rate of the electronic device, and thus indicating an amount of energy used to transmit/receive a certain amount of data by the electronic device. A smaller EE FOM indicates better energy efficiency of the electronic device. FIG. 2B shows examples of a first EE FOM and a second EE FOM corresponding to the first power 210 and the second power 220, respectively, according to embodiments of the disclosure.

The second power 220 increases proportionally with the data rate. Compared with the second power 220, the first power 210 is relatively constant with respect to the data rate with a much smaller slope. Thus the second EE FOM is relatively constant with respect to the data rate while the first EE FOM decreases drastically when the data rate is small indicating that the second electronic device is more energy efficient than the first electronic device and energy efficiencies of the first and second electronic devices are similar at a high data rate.

The energy consumption can be relatively large or can increase significantly due to CA and/or DC. In a 5G network, a peak data rate (e.g., a second data rate shown in FIG. 2A) can reach 5 Gbps (gigabit per second). Thus, an electronic device can consume a significant amount of power in the connected mode and can experience overheating when the data rate is significantly high. Thus, it is desirable to improve the energy efficiency when the data rate is high.

When the data rate is minimal at a first data rate (e.g., 0 or approximately 0), the first power 210 corresponds to a first baseline power and the second power 220 corresponds to a second baseline power, and thus indicating that an electronic device (e.g., the first electronic device, the second electronic device) can consume baseline power with minimal or no data transmission between the electronic device and the network, for example, in idle monitoring.

Referring to FIG. 2A, differences of the first power 210 and the second power 220 are described below. The first baseline power is significantly higher than the second baseline power indicating that the first electronic device is less power efficient than the second electronic device in an idle state or when the data rate is minimal. Referring to FIG. 2B, the first EE FOM is significantly larger than the second EE FOM when the data rate is close to the first data rate. Thus, the first electronic device can consume a large amount of power in the idle monitoring. In general, a lower baseline power (e.g., the second baseline power) is more desirable. Thus, it is desirable to improve the energy efficiency (e.g., reduce the baseline power) when the data rate is minimal.

In an example, the network 101 can schedule data transmission so that an amount of data can be transmitted/received over a first duration instead of over a second duration that is much longer than the first duration. Of course, a peak power at a peak data rate (e.g., the second data rate) can be kept below a power threshold to avoid overheating of the electronic device 110 since the electronic device 110 is to be cooled down before resuming data transmission/reception when the electronic device 110 is overheated. In general, the electronic device 110 is to be configured to reduce idle monitoring and maintain power efficiencies at various data rates, and thus the network 101 can configure the electronic device 110 to reduce a baseline power as well as powers at various data rates. In an example, the electronic device 110 can be configured to have energy efficiency described by the second power 220 or the second EE FOM where the second baseline power is relatively small.

Certain features, such as an EE indicator described above, a power performance indicator, an overheating indication, a power preference indication, and the like, may indicate a status of the energy consumption of the electronic device to a network. The power preference indication can indicate two states (or preferences), such as a performance state with high bit rate and a power saving state with low bit rate. For example, when the EE indicator indicates low power efficiency or the overheating indication is received by the network, the network can adjust configurations for the electronic device to improve the energy efficiency of the electronic device and save energy. Mechanisms for emergency breaks including, for example, overheating indication can be designed to mitigate the overheating at a high data rate, for example, in NR. In an example, an electronic device is not to be scheduled for data transmission/reception over a long time. Accordingly, when the electronic device is close to being overheated, another electronic device can be scheduled for data transmission. In summary, the electronic device is not energy efficient during overheating or idle monitoring. Accordingly, the EE indicator can be used to indicate the energy efficiency of the electronic device 110. The EE indicator can be determined and reported to the network 101, for example, to help improving the energy efficiency of the electronic device 110.

As described above, the energy efficiency of the electronic device 110 can be indicated by the EE indicator (e.g., the EE FOM, the EE KPI). The EE indicator can indicate an amount of energy used per data unit transmitted/received by the electronic device 110 (e.g., the EE indicator represents the energy consumed per bit of data), an amount of data transmitted/received by the electronic device 110 per energy unit (e.g., the EE indicator represents the amount of data per energy consumed), or the like.

In an embodiment, the EE KPI is a ratio of an amount of data flow between the electronic device 110 and the network 101 over a duration over an energy consumption by the electronic device 110 over the same duration. The amount of data flow can also be referred to as a data volume transmitted and/or received by the electronic device 110. In an example, the data flow includes user data and excludes control data (e.g., RRC signaling) used for signaling. The energy consumption includes energy consumed in user data, in control data, in idle monitoring, and the like over the duration. Thus, the EE KPI can indicate how much energy is used to transmit/receive the user data over the duration. The duration can correspond to a duration over which an event (e.g., one or more RRC connections) occurs, a duration over which a certain amount of data is transmitted/received, a duration over which a file is transmitted/received, a predetermined duration (e.g., 100 millisecond (ms)), or the like. In an example, the pre-determined duration is stored in the memory 140 or received from the network 101. In an example, the data flow represents the user data to/from the electronic device 110 in a RRC connection, and the energy consumption represents the energy consumed in the same RRC connection. The user data can include uplink (UL) data transmitted from the electronic device 110 to the network 101 and downlink (DL) data transmitted to the network 101 by the electronic device 110.

In an example, units of the amount of data flow and the corresponding energy consumption are 'bit' and 'Joule'. In an example, the energy consumption is represented using an arbitrary unit.

In various embodiments, the EE KPI is a KPI of the network 101. Determining and reporting the EE KPI to the network 101 can be beneficial for improving energy efficiency of the electronic device 110.

Figure 3A:
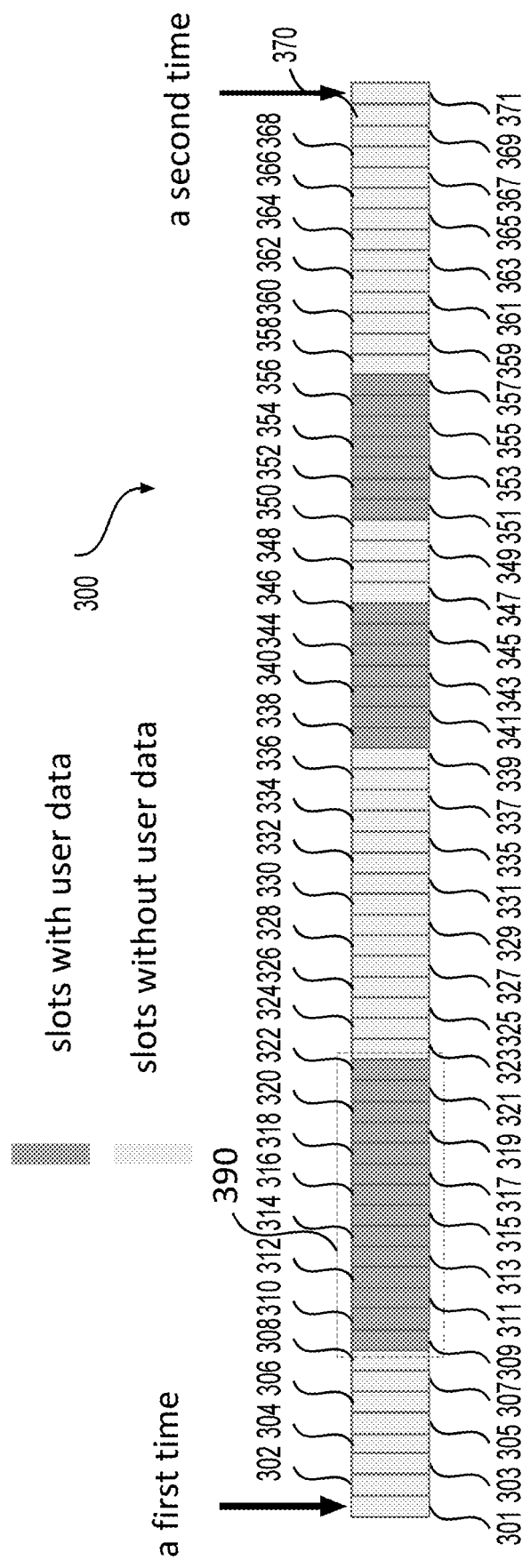
FIG. 3A shows an example of EE indicator measurement according to an embodiment of the disclosure.

FIG. 3A shows an example of EE indicator measurement according to an embodiment of the disclosure. In an example, the EE indicator is the EE KPI that can be measured by the electronic device 110 and/or the network 101. Referring to FIG. 3, a RRC connection is established between the electronic device 110 and the network 101 at a first time and is released at a second time. A time-domain structure (also referred to as a structure) 300 is used by the electronic device 110 and the network 101 to communicate wirelessly over a duration D (i.e., a time difference between the second time and the first time) of the RRC connection. The structure 300 includes multiple time slots (or slots) 301-371. Each of the multiple slots 301-371 can have a same interval, such as a Transmission Time Interval (TTI). A TTI can be 0.0625 milliseconds (ms), 0.125 m, 0.25 ms, 0.5 ms, 1 ms, or the like. Each slot can have any suitable frequency-domain structure and/or configurations, such as a suitable bandwidth, a center frequency, CA, DC, and/or the like. The multiple slots 301-371 can include first slots (i.e., slots filled with light gray color including slots 301-308, 323-339, 347-350, and 358-371) and second slots (i.e., slots filled with dark gray color including slots 309-322, 338-346, and 351-357). The first slots exclude user data and can include control data or no data. Each of the second slots can include user data (e.g., UL user data, DL user data). A label 390 indicates user data that occurs first in the structure 300.

Energies are consumed in the first slots and the second slots. The energy consumption over the duration D (i.e., the energy consumption of the multiple slots 301-371) can be determined based on energies consumed within the respective multiple slots 301-371 using any suitable power consumption model (also referred to as energy consumption model) as described below. In general, the power consumption model can be a standardized power consumption model (e.g., a network power consumption model used by the network 101), a dedicated power consumption model (also referred to as a device-specific power consumption model, such as a proprietary power consumption model) used by, for example, the electronic device 110.

The same standardized power consumption model can be applied to different electronic devices (e.g., electronic devices manufactured by different manufacturers) to measure respective energy consumptions over a same duration. On the other hand, different dedicated power consumption models are tailored to the different electronic devices, and thus the respective energy consumptions of the different electronic devices can be measured more accurately by using the dedicated power consumption models.

FIG. 3B shows an exemplary dedicated power consumption model 381 for the electronic device 110 according to an embodiment of the disclosure. The dedicated power consumption model 381 can include power states 1-5. Each of the power states 1-5 can indicate power consumption (e.g., an average power consumption) of the electronic device 110 for a certain operation and/or configuration (also referred to as operation/configuration) of the electronic device 110. The operation can refer to usage of DC, CA, UL, DL, DRX, BWP, a data rate, and/or the like when the electronic device 110 communicates with the network 101. The configuration can refer to DC, CA, UL, DL, DRX, BWP, a data rate, and/or the like that are configured for the electronic device 110. Thus, the power states 1-5 can indicate five levels of power consumptions corresponding to five operations/configurations 1-5. The dedicated power consumption model 381 can include the five operations/configurations 1-5 and/or relative powers (in A. U.) for the power states 1-5. In an example, the five operations/configurations 1-5 include a first sleep mode (e.g., a first DRX mode), a second sleep mode (e.g., a second DRX mode), a third sleep mode (e.g., a third DRX mode), a DL mode (e.g., including DL user data), and an UL mode (e.g., including UL user data). In an example, such as shown in FIG. 3B, the relative powers are different and include 1.1, 19.5, 45.5, 105, and 310 for the respective power states, and thus the five levels of power consumptions are different. A number of the power states is a positive integer larger than 1, such as 5, 6, 7, 8.

FIG. 3C shows an exemplary standardized power consumption model 382 according to an embodiment of the disclosure. The standardized power consumption model 382 can include power states 1-5, five operations/configurations 1-5, and relative powers (in A. U.) for the power states 1-5. In an example, the relative powers are different and include 1, 20, 45, 100, and 300 for the respective power states. One or more of the relative powers can be identical. For example, the relative powers include 1, 20, 45, 100, and 100. A number of the power states is a positive integer larger than 1, such as 5, 6, 7, 8.

In an example, a number of power states and relative powers for the power states used for different electronic devices are identical in the standardized power consumption model, and thus effects of device-specific operations/configurations on the relative powers for the power states are not taken into consideration. Accordingly, the same standardized power consumption model is applied to the different electronic devices to determine the energy consumption. As described above, dedicated power consumption models are specific to the different electronic devices. A number of power states and/or corresponding relative powers for the power states in the dedicated power consumption models can be different from each other and from those in the standardized power consumption model 382.

In an example, as shown in FIGS. 3B-3C, the number (e.g., 5) of power states is identical in the dedicated power consumption model 381 and the standardized power consumption model 382, the relative powers for the power states in the dedicated power consumption model 381 are different from the relative powers for the power states in the standardized power consumption model 382. For example, to account for the device-specific operation/configuration 1 for the electronic device 110, the relative power for the power state 1 in the dedicated power consumption model 381 is increased by 10% to 1.1 from the relative power of 1 used in the standardized power consumption model 382. Thus, calculating or estimating the energy consumption with the dedicated power consumption model 381 can generate more accurate result or estimation of the energy consumption for the electronic device 110.

Referring back to FIGS. 1 and 3A, for each of the multiple slots 301-371, the processing circuitry 150 can be configured to determine a slot-specific power state based on operations and/or configurations of the electronic device 110 in the slot where the slot-specific power state can be one of the power states in the power consumption model. The slot-specific power state can indicate power consumption (e.g., an average power consumption of the electronic device 110) in the slot. Since the multiple slots 301-371 have the same interval (e.g., the TTI), the slot-specific power state can indicate an energy consumption of the slot. A slot-specific relative power can be determined based on the slot-specific power state and the power consumption model as shown in FIGS. 3B-3C.

As described above, the operations of the electronic device 110 can include a bandwidth, a data rate, and/or BWP of the electronic device 110, can indicate whether the electronic device 110 is in the connected mode or the idle mode, whether the electronic device 110 has user data (e.g., UL user data, DL user data), whether the electronic device 110 uses DRX, CA, and/or DC, and/or the like. The configurations of the electronic device 110 can include a bandwidth, a data rate, and/or BWP configured for the electronic device 110, can indicate whether the electronic device 110 is configured in the connected mode or the idle mode, whether the electronic device 110 is configured to transmit/receive user data (e.g., UL user data, DL user data), whether the electronic device 110 is configured with DRX, CA, and/or DC, and/or the like.

In an example, the operations and/or the configurations of the electronic device 110 in the slot can be compared with the operations/configurations for the power states in the power consumption model, and thus the slot-specific power state is determined to be the one of the power states whose operation/configuration is a closest match of the operations and/or the configurations of the electronic device 110 in the slot.

In an example, the power consumption model is the dedicated power consumption model 381. Referring back to FIGS. 3A-3B, the first slots have the power states 1-3 that, for example, correspond to different sleep modes, and the second slots have the power states 4-5, for example, depending on UL and DL user data. For example, the operation of the electronic device 110 in the slot 301 is determined to match the first sleep mode (e.g., the operation 1 in the dedicated power consumption model 381), and thus a slot-specific power state for the slot 301 is determined to be the power state 1 in the dedicated power consumption model 381. A slot-specific relative power (e.g., 1.1) can be determined based on the slot-specific power state for the slot 301 and the dedicated power consumption model 381 in FIG. 3B. Similarly, the processing circuitry 150 can determine slot-specific power states and respective slot-specific relative powers for the slots 302-371.

Referring to FIGS. 1 and 3A, the processing circuitry 150 can calculate the energy consumption over the duration D based on the respective slot-specific power states for the multiple slots 301-371. For example, the processing circuitry 150 can sum the relative powers of the multiple slots 301-371. As described above, the energy consumption includes all the energy consumed over the duration D. The energy consumption determined as described above can be an estimation or an approximation of energy consumed over the duration D.

The power consumption model (e.g., the dedicated power consumption model 381, the standardized power consumption model 382) can be pre-configured in the electronic device 110. Alternatively, the power consumption model can be obtained by the electronic device 110, for example, from the network 101 or from operation, administration and maintenance (OAM).

The processing circuitry 150 can determine the data flow over the duration D. In an embodiment, the processing circuitry 150 can determine the data flow based on the second slots. In an example, the data flow only includes the user data within the second slots and excludes the control data within the multiple slots 301-371. Further, the processing circuitry 150 can calculate the EE indicator (e.g., the EE KPI) based on the data flow and the determined energy consumption over the duration D. In an example, the processing circuitry 150 can calculate the EE indicator (e.g., the EE KPI) to be a ratio of the data flow over the determined energy consumption over the duration D.

The above description can be applicable when the electronic device 110 is configured with or without CA and/or DC, with any suitable BWP in a slot. The power consumption model can be pre-determined and stored in the memory 140 or being signaled to the electronic device 110.

In an example, the EE indicator (e.g., the EE KPI) is determined or measured by the electronic device 110. The processing circuitry 150 can report the EE indicator to the network 101 (e.g., a cloud server). The processing circuitry 150 can report the EE indicator periodically. In an example, a fixed period (e.g., 100 ms,) can be pre-defined and the EE indicator is reported in every period. Alternatively, a varying period (e.g., between 50 to 200 ms) can be used and the EE indicator is reported using the varying period. The processing circuitry 150 can report the EE indicator based on triggering event(s) (e.g., RRC events), and thus the reporting of the EE indicator can be event triggered. The EE indicator can be stored in the memory 140 and subsequently can be reported when the trigger event occurs. In an example, the EE indicator is reported for each RRC connection or multiple RRC connections. In an example, the EE indicator is reported when a file transmission is completed. The triggering event can be an error event. Thus, the EE indicator can be reported when an error case for the error event is logged. For example, an overheating case (including a cell identification (ID)) of the electronic device 110 is logged, and thus the corresponding EE indicator is reported. In an example, the processing circuitry 150 can report the EE indicator via Minimization of Drive Tests (MDT) or UE assistance information.

The processing circuitry 150 can report the EE indicator after a single measurement of the EE indicator. Alternatively, the processing circuitry 150 can determine EE indicators multiple times, obtain an average of the EE indicators, and subsequently report the averaged EE indicator. The EE indicator(s) measured or determined by the processing circuitry 150 can be stored in the memory 140.

The processing circuitry 150 can be implemented using various techniques, such as integrated circuits, one or more processors executing software instructions, and the like.

The memory 140 can be any suitable device for storing data and instructions to control operations of the electronic device 110. In an example, the memory 140 stores information indicating power consumption model(s) and parameter(s) for determining energy efficiency of the electronic device, and software instructions to be executed by a processor, such as the processing circuitry 150. The power consumption model(s) can include any suitable models to determine, for example, energy consumption of the electronic device, such as the dedicated power consumption model 381 and/or the standardized power consumption model 382. The information can include or indicate power states, relative powers, operations/configurations corresponding to the power states, and/or the like. The memory 140 can store EE indicator(s) measured by the processing circuitry 150.

In an embodiment, the memory 140 can be non-volatile memory, such as read-only memory, flash memory, magnetic computer storage devices, hard disk drives, solid state drives, floppy disks, and magnetic tape, optical discs, and the like. In an embodiment, the memory 140 can be a random access memory (RAM). In an embodiment, the memory 140 can include non-volatile memory and volatile memory.

Referring back to FIGS. 1 and 3A, the network 101 can be configured to determine the energy efficiency of the electronic device 101 based on the structure 300. The network 101 can include processing circuitry 122 that determines the amount of data (or the data flow) transmitted between the electronic device 110 and the network 101 over the duration D. The processing circuitry 122 can receive information indicating the data flow using any suitable wireless and/or wired communication technology. The data flow can include the user data and exclude the control data over the duration D. The data flow can include the user data in the second slots and exclude control data in the multiple slots 301-371.

Further, the network 101, such as the processing circuitry 122, can be configured to determine an energy consumption of the electronic device 110 over the duration D based on a power consumption model, such as the standardized power consumption model 382, the dedicated power consumption model 381, similar to those described above. Note that for each of the multiple slots 301-371, a slot-specific power state can be determined based on configurations (instead of the operations) of the electronic device 110 in the slot where the slot-specific power state can be one of the power states in the power consumption model. The energy consumption over the duration D can be calculated based on the respective slot-specific power states for the multiple slots 301-371. As described above, the energy consumption includes all the energy consumed over the duration D. The energy consumption determined as described above can be an estimation of energy consumed over the duration D.

The network 101, such as the processing circuitry 122, can be configured to calculate an EE indictor (e.g., a KPI of the network 101) based on the data flow and the energy consumption determined above.

Based on the EE indicator, the network 101 can adjust configuration parameters for the electronic device 110 to reduce energy consumption of the electronic device 110. Alternatively, the above described method can be applied multiple times by the network 101 to determine multiple EE indicators. Subsequently, the network 101 can obtain an average of the multiple EE indicators and determine whether and/or how to adjust the configuration parameters for the electronic device 110 to reduce energy consumption of the electronic device 110 based on the average.

The above description can be applicable, for example, when the electronic device 110 is configured without DC in the multiple slots 301-371. In FIG. 1, the processing circuitry 122 is shown to be outside the base stations 120-121. The above description can also be applicable when the processing circuitry 122 is located in the base station 120.

When a slot is configured with DC, the above description can be suitably adapted. In an example, the electronic device 110 is configured having DC with the base stations 120-121. The processing circuitry 122 is located outside the base stations 120-121, as shown in FIG. 1. The base stations 120-121 can communicate information regarding a first amount of data between the electronic device 110 to/from the base station 120 and a second amount of data between the electronic device 110 to/from the base station 121. The processing circuitry 122 can receive information indicating the first amount of data and the second amount of data from the base station 120 and/or the base station 121. Thus, in an example, the first amount of data can be determined and the second mount of data can be determined. Accordingly, the data flow can be a sum of the first mount of data and the second mount of data. Alternatively, the electronic device 110 is configured having DC with the base stations 120-121 and the processing circuitry 122 is located in the base station 120. The base station 120 can receive information regarding the second amount of data between the electronic device 110 to/from the base station 121.

Further, the base stations 120-121 can communicate information regarding configurations (e.g., DC) of the electronic device 110 with the base stations 120-121.

The power consumption model can be pre-configured by the network 101. Alternatively, the power consumption model can be obtained by the network 101, for example, from OAM. The power consumption model can be stored by the network 101.

In an example, the EE indicator or the EE KPI as described above and determined based on the power consumption model by the electronic device 110 or by the network 101, for which can be a standardized indictor or KPI of the network 101. Accordingly, the standardized EE indicator or the EE KPI can be applicable to different electronic devices from different manufacturers, and thus the network 101 or an operator can compare EE indicators across the different electronic devices and/or the different manufacturers.

In the above description, the multiple slots 301-371 have the identical time interval. The above description can be suitably adapted to obtain the energy consumption over the duration D when the multiple slots 301-371 have different time intervals. In an example, the energy consumption over the duration D can be determined based on the slot-specific power states and the time intervals of the multiple slots 301-371.

In an example, to increase calculation efficiency, slot-specific power states of a subset of the multiple slots 301-371 are determined and used to determine or estimate the energy consumption of the multiple slots 301-371.

The energy consumption within a duration can be determined using any suitable method. In an example, a power (e.g., an instant power, an average power) of the electronic device 110 can be measured in real time by measuring a current and a voltage. Subsequently, an average energy consumption can be estimated using the power and the duration. The energy consumption information can be sent to the network 101 from the electronic device 110.

Figure 4:
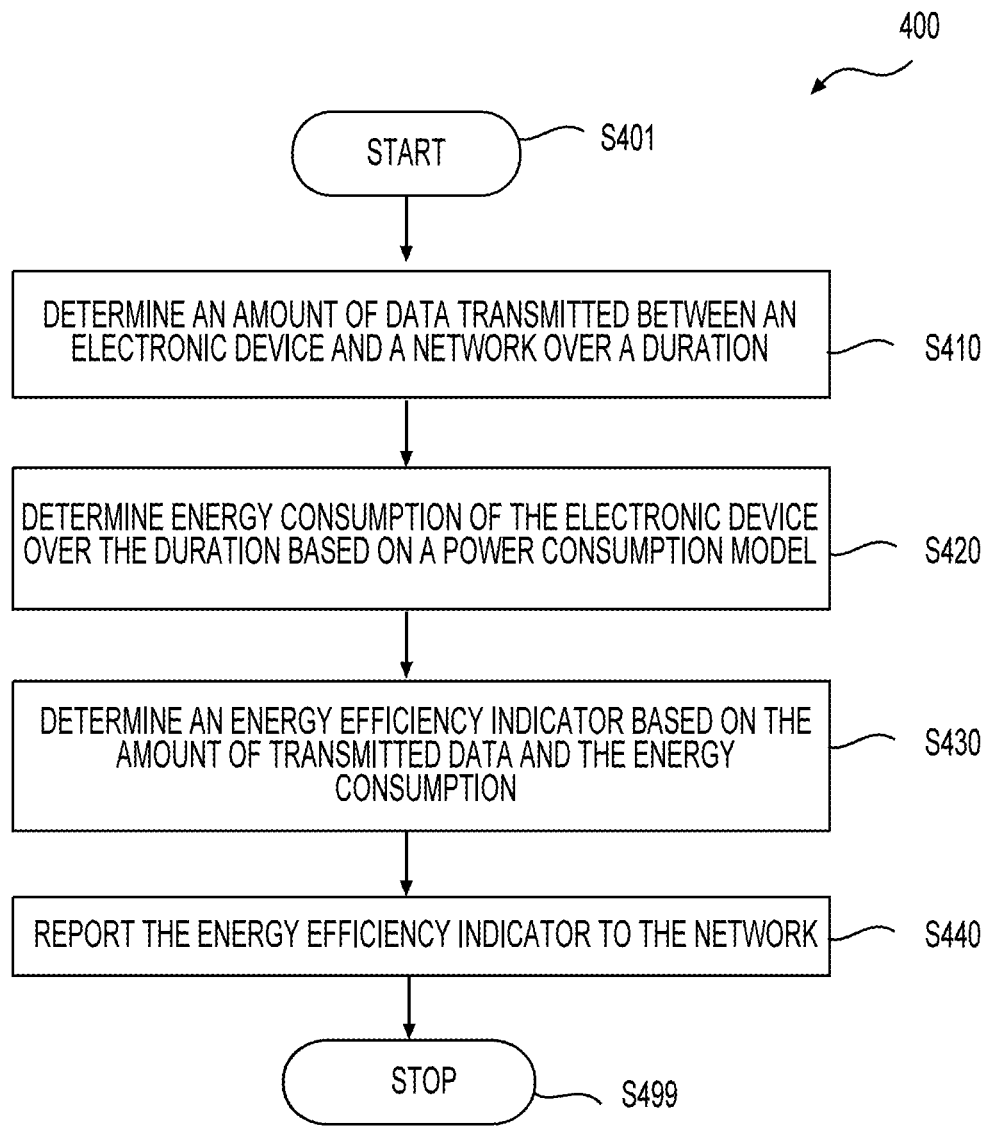
FIG. 4 shows a flow chart of an exemplary process 400 for energy efficiency measurement according to an embodiment of the disclosure.

FIG. 4 shows a flowchart of an exemplary process 400 according to an embodiment of the disclosure. The process 400 can be used to determine energy efficiency of an electronic device. In an example, an electronic device is configured to perform the process 400. The descriptions below are given using the communication system 100 including the electronic device 110 and the network 101 as an example, the descriptions can be suitably adapted to other electronic devices, networks, and communication systems. As shown below, the electronic device 110 is configured to perform the process 400 and determine an EE indicator indicating the energy efficiency of the electronic device 110. The process 400 starts at S401 where the network 101 provides wireless communication service to the electronic device 110. The process proceeds to S410.

At S410, an amount of data transmitted between an electronic device (e.g., the electronic device 110) and a network (e.g., the network 101) can be determined over a duration, as described above with reference to FIGS. 1 and 3A. The duration can be a duration of an event (e.g., a RRC connection) or a pre-determined duration (e.g., 100 ms). In an example, a time-domain structure (e.g., the structure 300) including multiple slots is used by the electronic device and the network to communicate wirelessly over the duration. The amount of data can include user data and exclude control data over the duration. The amount of data can include user data in the multiple slots and exclude control data in the multiple slots.

At S420, energy consumption of the electronic device over the same duration can be determined based on a power consumption model, as described above with reference to FIGS. 1 and 3A-3C. The power consumption model (e.g., including power states) can be any suitable model, such as the dedicated power consumption model 381, the standardized power consumption model 382.

For each of the multiple slots, a slot-specific power state can be determined based on operations and/or configurations of the electronic device in the slot where the slot-specific power state can be one of the power states in the power consumption model. The energy consumption over the duration D can be calculated based on the respective slot-specific power states for the multiple slots. As described above, the energy consumption includes all the energy consumed over the duration. The energy consumption determined as described above can be an estimation of energy consumed over the duration.

At S430, an EE indicator can be determined based on the amount of data and the energy consumption over the duration. In an example, the EE indicator (e.g., an EE KPI) can be calculated as a ratio of the amount of data over the energy consumption over the duration. In an example, multiple EE indicators are determined over a plurality of durations, as described above, and thus the EE indicator is an average of the multiple EE indicators.

At S440, the EE indicator can be reported (e.g., sent) to the network, as described above. The EE indicator can be reported periodically or based on a triggering event (e.g., an error event). Thus, the EE indicator can be reported when an error case for the error event is logged. The process 400 proceeds to S499, and terminates.

The process 400 can be suitably adapted for various applications and scenarios in communication systems. For example, an order of implementing the steps S410, S420, S430, and S440 can be suitably adjusted (e.g., S410 can be implemented prior to or after S420).

Figure 5:
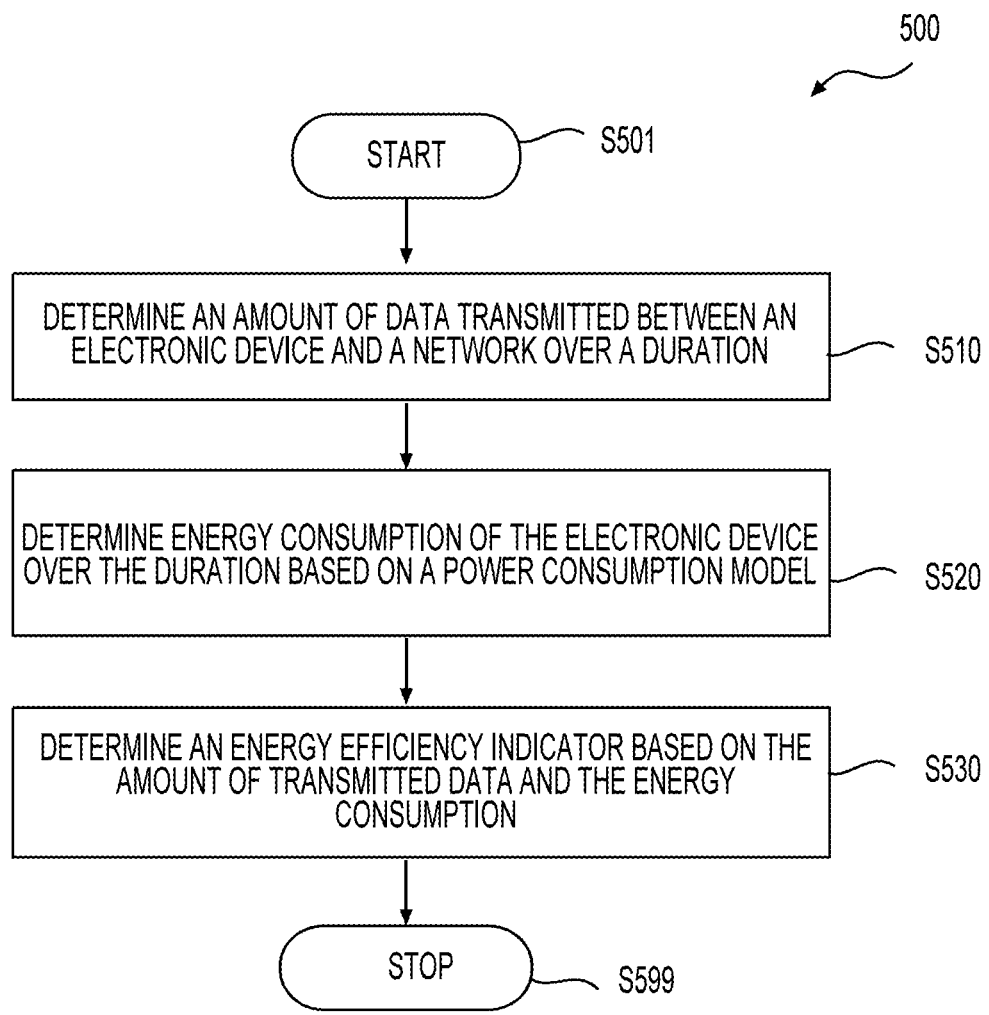
FIG. 5 shows a flow chart of an exemplary process 500 for energy efficiency measurement according to an embodiment of the disclosure.

FIG. 5 shows a flowchart of an exemplary process 500 according to an embodiment of the disclosure. The process 500 can be used to determine energy efficiency of an electronic device where wireless communication service for the electronic device is provided by a network. In an example, the network, such as the processing circuitry 122 in the network 101, is configured to perform the process 500. The descriptions below are given using the communication system 100 including the electronic device 110 and the network 101 as an example, the descriptions can be suitably adapted to other electronic devices, networks, and communication systems. As shown below, the network is configured to perform the process 500 and determine an EE indicator indicating the energy efficiency of the electronic device. The process 500 starts at S501 and proceeds to S510.

At S510, an amount of data transmitted between the electronic device (e.g., the electronic device 110) and the network (e.g., the network 101) can be determined over a duration, similar or identical to those as described above with reference to S410. In an example, a time-domain structure (e.g., the structure 300) including multiple slots is used by the electronic device and the network to communicate wirelessly over the duration. The amount of data can include user data and exclude control data over the duration. The amount of data can include user data in the multiple slots and exclude control data in the multiple slots.

At S520, energy consumption of the electronic device over the same duration can be determined based on a power consumption model, similar to those described above with reference to FIGS. 1 and 3A-3C. The power consumption model (e.g., including power states) can be any suitable model. In an example, the power consumption model is the standardized power consumption model 382, for example, a network power consumption model that is used by the network and can be applicable to different electronic devices.

For each of the multiple slots, a slot-specific power state can be determined based on configurations of the electronic device in the slot where the slot-specific power state can be one of the power states in the power consumption model. The energy consumption over the duration can be calculated based on the respective slot-specific power states for the multiple slots. As described above, the energy consumption includes all the energy consumed over the duration. The energy consumption determined as described above can be an estimation of energy consumed over the duration.

At S530, an EE indicator can be determined based on the amount of data and the energy consumption over the duration, as described with reference to S430.

The process 500 can be suitably adapted for various applications and scenarios in communication systems. For example, an order of implementing the steps S510 and S520 can be suitably adjusted (e.g., S510 can be implemented prior to or after S520). Additional step(s) can be added. For example, after obtaining the EE indicator (e.g., a KPI of the network) at S530, the network adjusts configuration parameters for the electronic device to reduce energy consumption of the electronic device based on the EE indicator.

The process 500 as described above can be applicable, for example, when the electronic device is configured without DC in the multiple slots. When the electronic device is configured to have DC with two base stations (e.g., the base stations 120-121) in a slot, a step can be added, for example, prior to S510 and S520. In an example, the process 500 is implemented by the processing circuitry 122 that is located outside the base stations 120-121. In the step, signaling can be received from the base station 120 and/or the base station 121, for example, by the processing circuitry 122. The signaling can indicate a first amount of data between the electronic device 110 and the base station 120 and a second amount of data between the electronic device 110 and the base station 121. The signaling can indicate configurations (e.g., DC) of the electronic device with the base stations 120-121. In an example, the process 500 is implemented by the processing circuitry 122 that is located inside the base station 120. In the step, the signaling can be received from the base station 121. The signaling can indicate the second amount of data between the electronic device 110 and the base station 121. The signaling can further indicate configurations (e.g., DC) of the electronic device with the base stations 120-121.

Thus, in an example, at S510, the first amount of data can be determined and the second mount of data can be determined. Accordingly, the amount of data can be a sum of the first mount of data and the second mount of data.

In an example, a step can also be added to determine the configurations of the electronic device within the slot based on the signaling.

The various circuitry, circuits, components, modules, and the like in the present disclosure can be implemented using any suitable technology, such as an integrated circuit (IC), ICs, digital signal processors (DSPs), microprocessors, CPUs, field programmable gate arrays, (FPGAs), Application-specific integrated circuits (ASICs), and the like. In an example, the various circuitry, components, modules, and the like can also include one or more processing circuits executing software instructions.

While aspects of the present disclosure have been described in conjunction with the specific embodiments thereof that are proposed as examples, alternatives, modifications, and variations to the examples may be made. Accordingly, embodiments as set forth herein are intended to be illustrative and not limiting. There are changes that may be made without departing from the scope of the claims set forth below.

What is claimed is:

1. A method for determining energy efficiency of an electronic device, comprising:
   determining, by processing circuitry of the electronic device, an amount of data transmitted between the electronic device and a network over a duration, the electronic device receiving wireless communication service from the network;
   determining an energy consumption of the electronic device over the duration based on a power consumption model, the power consumption model including power states that indicate different levels of power consumptions, the duration including a first time slot corresponding to a first one of the power states and a second time slot corresponding to a second one of the power states, the first one of the power states being different from the second one of the power states; and
   calculating an energy efficiency indicator based on the amount of data transmitted and the energy consumption.

2. The method according to claim 1, further comprising:
   periodically reporting the energy efficiency indicator to the network.

3. The method according to claim 1, further comprising:
   reporting the energy efficiency indicator to the network based on a triggering event.

4. The method according to claim 1, wherein the duration corresponds to one or more radio resource control connections or a pre-defined duration.

5. The method according to claim 1, wherein
   the duration includes multiple time slots that has the first time slot and the second time slot; and
   determining the energy consumption includes:
      for each of the multiple time slots, determining a slot-specific power state based on operations of the electronic device within the time slot, the slot-specific power state being one of the power states in the power consumption model; and
      calculating the energy consumption over the duration based on respective slot-specific power states for the multiple time slots.

6. The method according to claim 5, wherein the power states in the power consumption model are specific to the electronic device and are different from power states in a network power consumption model.

7. The method according to claim 1, wherein the amount of data transmitted includes user data and excludes control data over the duration.

8. The method according to claim 1, wherein
   the energy efficiency indicator is a key performance indicator of the network; and
   calculating the energy efficiency indicator includes calculating the energy efficiency indicator as a ratio of the amount of data transmitted over the energy consumption.

9. An electronic device, comprising processing circuitry configured to:
   determine an amount of data transmitted between the electronic device and a network over a duration, the electronic device receiving wireless communication service from the network;
   determine an energy consumption of the electronic device over the duration based on a power consumption model, the power consumption model including power states that indicate different levels of power consumptions, the duration including a first time slot corresponding to a first one of the power states and a second time slot corresponding to a second one of the power states, the first one of the power states being different from the second one of the power states; and
   calculate an energy efficiency indicator based on the amount of data transmitted and the energy consumption.

10. The electronic device according to claim 9, wherein the processing circuitry is further configured to:
    periodically report the energy efficiency indicator to the network.

11. The electronic device according to claim 9, wherein the processing circuitry is further configured to:
    report the energy efficiency indicator to the network based on a triggering event.

12. The electronic device according to claim 9, wherein the duration corresponds to one or more radio resource control connections or a pre-defined duration.

13. The electronic device according to claim 9, wherein
    the duration includes multiple time slots that has the first time slot and the second time slot; and
    the processing circuitry is further configured to:
       for each of the multiple time slots, determine a slot-specific power state based on operations of the electronic device within the time slot, the slot-specific power state being one of the power states in the power consumption model; and
       calculate the energy consumption over the duration based on respective slot-specific power states for the multiple time slots.

14. The electronic device according to claim 13, wherein the power states in the power consumption model are specific to the electronic device and are different from power states in a network power consumption model used.

15. The electronic device according to claim 9, wherein the amount of data transmitted includes user data and excludes control data over the duration.

16. A method for determining energy efficiency of an electronic device, comprising:
    determining, by processing circuitry of a network, an amount of data transmitted between the electronic device and the network over a duration, the electronic device receiving wireless communication service from the network;
    determining an energy consumption of the electronic device over the duration based on a power consumption model, the power consumption model including power states that indicate different levels of power consumptions, the duration including a first time slot corresponding to a first one of the power states and a second time slot corresponding to a second one of the power states, the first one of the power states being different from the second one of the power states; and
    calculating an energy efficiency indictor based on the amount of data transmitted and the energy consumption.

17. The method according to claim 16, wherein
the duration includes multiple time slots that has the first time slot and the second time slot; and
determining the energy consumption includes:
for each of the multiple time slots, determining a slot-specific power state based on configurations of the electronic device within the time slot, the slot-specific power state being one of the power states in the power consumption model; and
calculating the energy consumption over the duration based on respective slot-specific power states for the multiple time slots.

18. The method according to claim 17, wherein the power consumption model is a network power consumption model.

19. The method according to claim 17, where
the network includes a first base station and a second base station;
the electronic device is configured for dual connectivity (DC) with the first base station and the second base station in one of the multiple time slots;
the method further includes:
receiving a signal from at least one of: the first base station and the second base station, the signal indicating at least one of: first user data between the first base station and the electronic device, second user data between the second base station and the electronic device, and a DC configuration of the electronic device in the one of the multiple time slots; and
determining the configurations of the electronic device within the one of the multiple time slots based on the signal; and
determining the amount of data includes determining the amount of data based on the signal.

20. The method according to claim 16, wherein the amount of data transmitted includes user data and excludes control data over the duration.

* * * * *